US008792919B2

(12) United States Patent
Koskela

(10) Patent No.: US 8,792,919 B2
(45) Date of Patent: Jul. 29, 2014

(54) PAGING DRX OPTIMIZATION

(75) Inventor: Jarkko Tuomo Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 12/390,172

(22) Filed: Feb. 20, 2009

(65) Prior Publication Data
US 2010/0022257 A1    Jan. 28, 2010

Related U.S. Application Data

(60) Provisional application No. 61/066,883, filed on Feb. 20, 2008.

(51) Int. Cl.
*H04W 68/00* (2009.01)
*H04W 68/02* (2009.01)

(52) U.S. Cl.
CPC .................................. *H04W 68/025* (2013.01)
USPC .......................................... 455/458; 370/229

(58) Field of Classification Search
USPC ................. 45/458, 422.1, 550.1, 414.1, 450, 45/452.1, 452.2; 370/229, 230, 231, 232, 370/310, 330, 206, 338; 455/458
See application file for complete search history.

(56) References Cited

U.S. PATENT DOCUMENTS

| 6,937,862 | B2 * | 8/2005 | Back et al. | 455/445 |
| 7,130,614 | B2 * | 10/2006 | Sreemanthula et al. | 455/411 |
| 7,340,250 | B2 * | 3/2008 | Sanchez | 455/433 |
| 7,466,719 | B2 * | 12/2008 | Xu et al. | 370/465 |
| 7,471,957 | B2 * | 12/2008 | Palkisto et al. | 455/458 |
| 7,684,357 | B2 * | 3/2010 | Jokinen et al. | 370/311 |
| 2007/0206524 | A1 * | 9/2007 | Suk | 370/320 |
| 2008/0220796 | A1 * | 9/2008 | Kohlmann et al. | 455/458 |
| 2009/0010213 | A1 * | 1/2009 | Yamada et al. | 370/329 |
| 2010/0272004 | A1 * | 10/2010 | Maeda et al. | 370/312 |
| 2011/0021215 | A1 * | 1/2011 | Iwamura et al. | 455/458 |

OTHER PUBLICATIONS

Nokia Corporation, Nokia Siemens Networks, "Paging DRX calculation in LTE." 3GPP TSG-RAN WG2 Meeting #61; Sorrento, Italy; Feb. 11-15, 2008.*
3GPP TS 36.300, V8.3.0 (Dec. 2007), 3rd Generation Partnership Project; Technical Specification Group Radio Access Network; Evolved Universal Terrestrial Radio Access (E UTRA) and Evolved Universal Terrestrial Access Network (E UTRAN), 2009, p. 1-13.
3GPP TS 36.304, V8.0.0 (Feb. 2008), 3rd Generation Partnership Project; Technical Specification Group Radio Access Network; Evolved Universal Terrestrial Radio Access (E-UTRA); User Equipment (UE) procedures in idle mode (Release 8), as is a Change Request related thereto: R2-081137, 3GPP TSG_RAN WG2#61 meeting, Sorrento, Italy, Feb. 11-15, 2008, p. 1-4.

(Continued)

*Primary Examiner* — Kent Chang
*Assistant Examiner* — Gerald Oliver
(74) *Attorney, Agent, or Firm* — Harrington & Smith

(57) ABSTRACT

In one exemplary embodiment of the invention, a method includes: receiving, by an apparatus, a first message having information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur; and receiving, by the apparatus, the at least one paging message in accordance with the information descriptive of N in relation to T.

16 Claims, 4 Drawing Sheets

401 — RECEIVING, BY AN APPARATUS, A FIRST MESSAGE COMPRISING INFORMATION DESCRIPTIVE OF A PARAMETER N IN RELATION TO A PARAMETER T, WHERE THE APPARATUS IS CONFIGURED TO PARTICIPATE IN DISCONTINUOUS RECEPTION OF AT LEAST ONE PAGING MESSAGE, WHERE N IS INDICATIVE OF A NUMBER OF PAGING GROUPS PER RADIO FRAME, WHERE T IS INDICATIVE OF A NUMBER OF RADIO FRAMES OVER WHICH THE DISCONTINUOUS RECEPTION IS TO OCCUR

402 — RECEIVING, BY THE APPARATUS, THE AT LEAST ONE PAGING MESSAGE IN ACCORDANCE WITH THE INFORMATION DESCRIPTIVE OF N IN RELATION TO T

(56) References Cited

OTHER PUBLICATIONS

Written Opinion and International Search Report Related to Application No. PCT/IB2009/000303 sent on Aug. 10, 2009, p. 1-12.

3GPP TS 36.304 V8.3.0 (Sep. 2008), Technical Specification, $3^{rd}$ Generation Partnership Project; Technical Specification Group Radio Access Network; Evolved Universal Terrestrial Radio Access (E-UTRA); User Equipment (UE) Procedures in Idle Mode, (Release 8), (28 pages).

3GPP TS 36.331 V8.0.0 (Dec. 2007), Technical Specification, $3^{rd}$ Generation Partnership Project; Technical Specification Group Radio Access Network; Evolved Universal Terrestrial Radio Access (E-UTRA); Radio Resource Control (RRC); Protocol Specification, (Release 8), (56 pages).

3GPP TS 36.331 V8.4.0 (Dec. 2008), Technical Specification, $3^{rd}$ Generation Partnership Project; Technical Specification Group Radio Access Network; Evolved Universal Terrestrial Radio Access (E-UTRA); Radio Resource Control (RRC); Protocol Specification, (Release 8), (198 pages).

R2-081137, Change Request for 3GPP TS 36.304 V8.8.0, 3GPP TSG-RAN WG2#61 meeting, Sorrento, Italy, Feb. 11-15, 2008, (40 pages).

R2-081144 (R2-080193), "Paging DRX calculation in LTE," Nokia Corporation, et al., 3GPP TSG-RAN WG2 Meeting #61, Sorrento, Italy, Feb. 11-15, 2008, (3 pages).

\* cited by examiner

CLUSTERED UEs IN
EVERY OTHER
PAGING OCCASION

PAGING DRX OPTIMIZATION

CROSS-REFERENCE TO RELATED APPLICATIONS

This patent application claims priority under 35 U.S.C. §119(e) from U.S. Provisional Patent Application No. 61/066,583, filed Feb. 20, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to signaling between a mobile communication apparatus and a network access node, in particular paging-related signaling.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
BW bandwidth
DL downlink (eNB towards UE)
DRX discontinuous reception
eNB E-UTRAN Node B (evolved Node B)
EDGE enhanced data rates for GSM evolution or enhanced GPRS
EPC evolved packet core
E-UTRAN evolved UTRAN (LTE)
FDMA frequency division multiple access
GERAN GSM/EDGE radio access network
GPRS general packet radio services
GSM global system for mobile communication
IMSI international mobile subscriber identity
LTE long term evolution of UTRAN (E-UTRAN)
MAC medium access control (layer 2, L2)
MM/MME mobility management/mobility management entity
Node B base station
OFDMA orthogonal frequency division multiple access
O&M operations and maintenance
PCCH physical control channel
PDCCH physical downlink control channel
PDCP packet data convergence protocol
PHY physical (layer 1, L1)
PRB physical resource block
P-RNTI paging radio network temporary identifier (paging group identifier)
RLC radio link control
RRC radio resource control
RRM radio resource management
SFN system frame number
S-GW serving gateway
SC-FDMA single carrier, frequency division multiple access
UE user equipment, such as a mobile station or mobile terminal
UL uplink (UE towards eNB)
UTRAN universal terrestrial radio access network A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4.1 of 3GPP TS 36.300, and shows the overall architecture of the E-UTRAN system 2. The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1-U interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Another specification of interest herein is 3GPP TS 36.304, V8.0.0 (2008-02), 3rd Generation Partnership Project; Technical Specification Group Radio Access Network; Evolved Universal Terrestrial Radio Access (E-UTRA); User Equipment (UE) procedures in idle mode (Release 8), as is a Change Request related thereto: R2-081137, 3GPP TSG_RAN WG2#61 meeting, Sorrento, Italy, 11-15 Feb. 2008.

An issue that arises with respect to the existing specifications is that the use of a UE-specific DRX may result in problems related to concentrating too many UEs in the same radio frames (e.g., for purposes of paging).

Paging may generally be seen to correspond to a UE monitoring one or more DL subframes in order to receive a P-RNTI (i.e. one or more paging messages having a P-RNTI assigned to the UE) transmitted on the PDCCH.

Following 3GPP TS 36.304 V8.0.0, for subclause 7.1 it was proposed that the paging DRX calculation be performed as follows:

Radio Frame of the paging occasion is given by the following equation:

$$SFN \bmod T = (T \operatorname{div} N) * (UE\_ID \bmod N)$$

In the above equation, note that: T is the paging DRX (non-UE-specific), for example, as measured in a number of radio frames. N is the number of paging groups. "div" stands for a division operator/operation. "mod" stands for a modulus operator/operation.

It was also proposed that the paging subframe used from the subframe pattern defined in subclause 7.2 be derived from following calculation:

Subframe from pattern=(*UE_ID*/N)mod Nsubframes_per_radioframe

However, this proposed procedure has a problem at least when the UE (multiple UEs) operates with UE-specific DRX. For example, consider broadcast parameters: T=128 (radio frames), N=64 and the UE has Tue (UE-specific paging DRX) of 64. The result is that those UEs with these specific UE DRX parameters will be concentrated (bunched) to specific paging occasions. This is true since the number of paging groups is the same for the UE-specific DRX case (64 in this example) as for UEs with broadcast paging DRX (128 in this case), e.g., UEs with paging DRX=64, and paging groups 64 have one paging group every radio frame. However, for non UE specific DRX (128) UEs there will exist a paging group only in every other radio frame. The end result of this will be more UEs clustered or bunched in every other radio frame, even though the intention would be to uniformly distribute UEs over the paging occasions. Reference in this regard may be made to FIG. 3. That is, FIG. 3 shows the undesirable clustering of UEs in certain paging occasions, which is a result of the conventional approach to providing UE-specific DRX.

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: receiving, by an apparatus, a first message comprising information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur; and receiving, by the apparatus, the at least one paging message in accordance with the information descriptive of N in relation to T.

In another exemplary embodiment of the invention, an apparatus comprising: a processor configured to implement discontinuous reception of at least one paging message; and a receiver configured to receive a first message comprising information descriptive of a parameter N in relation to a parameter T, where N is indicative of a number of paging groups per radio frame, where T is indicative of a number of radio frames over which the discontinuous reception is to occur, where the receiver is further configured to receive the at least one paging message in accordance with the information descriptive of N in relation to T.

In one exemplary embodiment of the invention, a method comprising: transmitting a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and transmitting the at least one paging message in accordance with the information descriptive of N in relation to T.

In another exemplary embodiment of the invention, an apparatus comprising: a processor configured to generate a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and a transmitter configured to transmit the first message, where the transmitter is further configured to transmit the at least one paging message in accordance with the information descriptive of N in relation to T.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
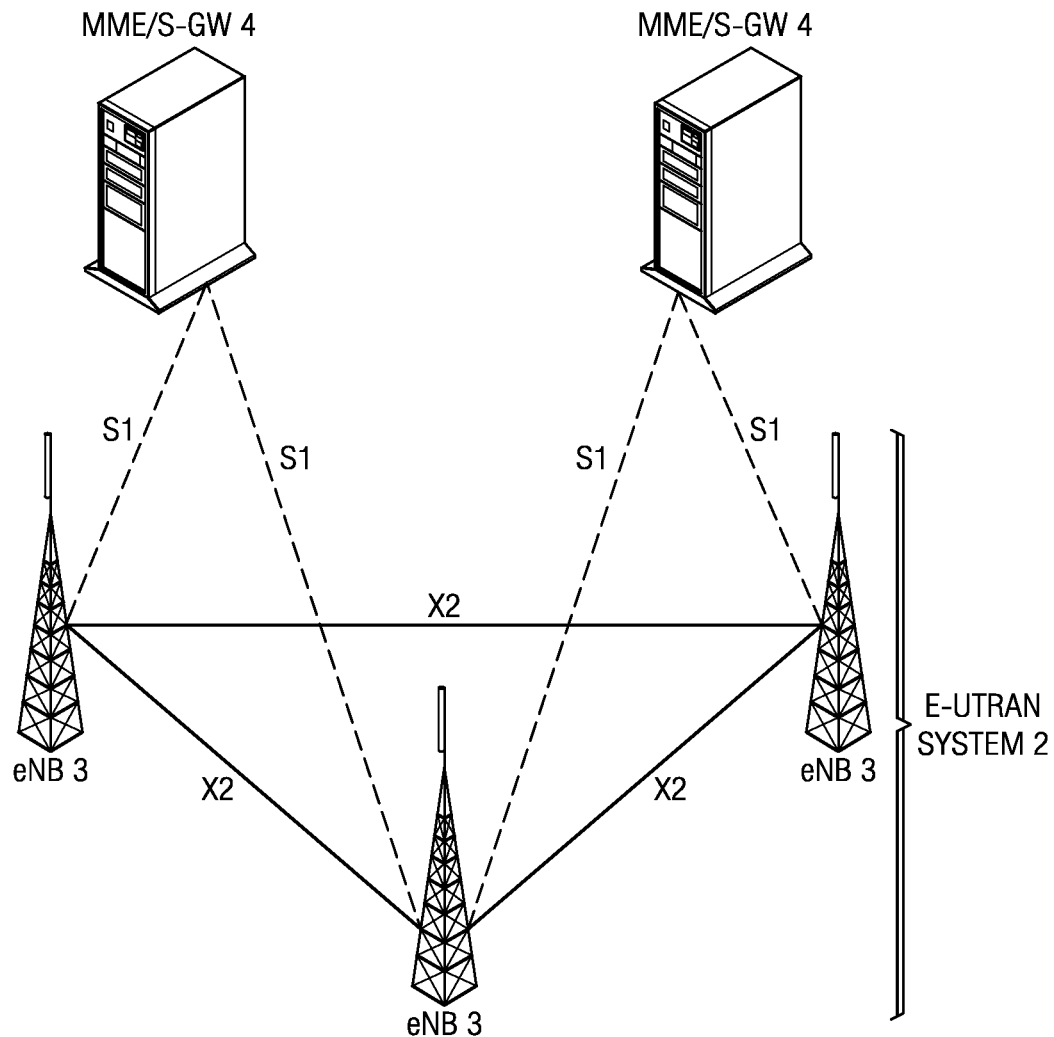
FIG. 1 reproduces FIG. 4 of 3GPP TS 36.300 V8.3.0, and shows the overall architecture of the E-UTRAN system.
Figure 2A:
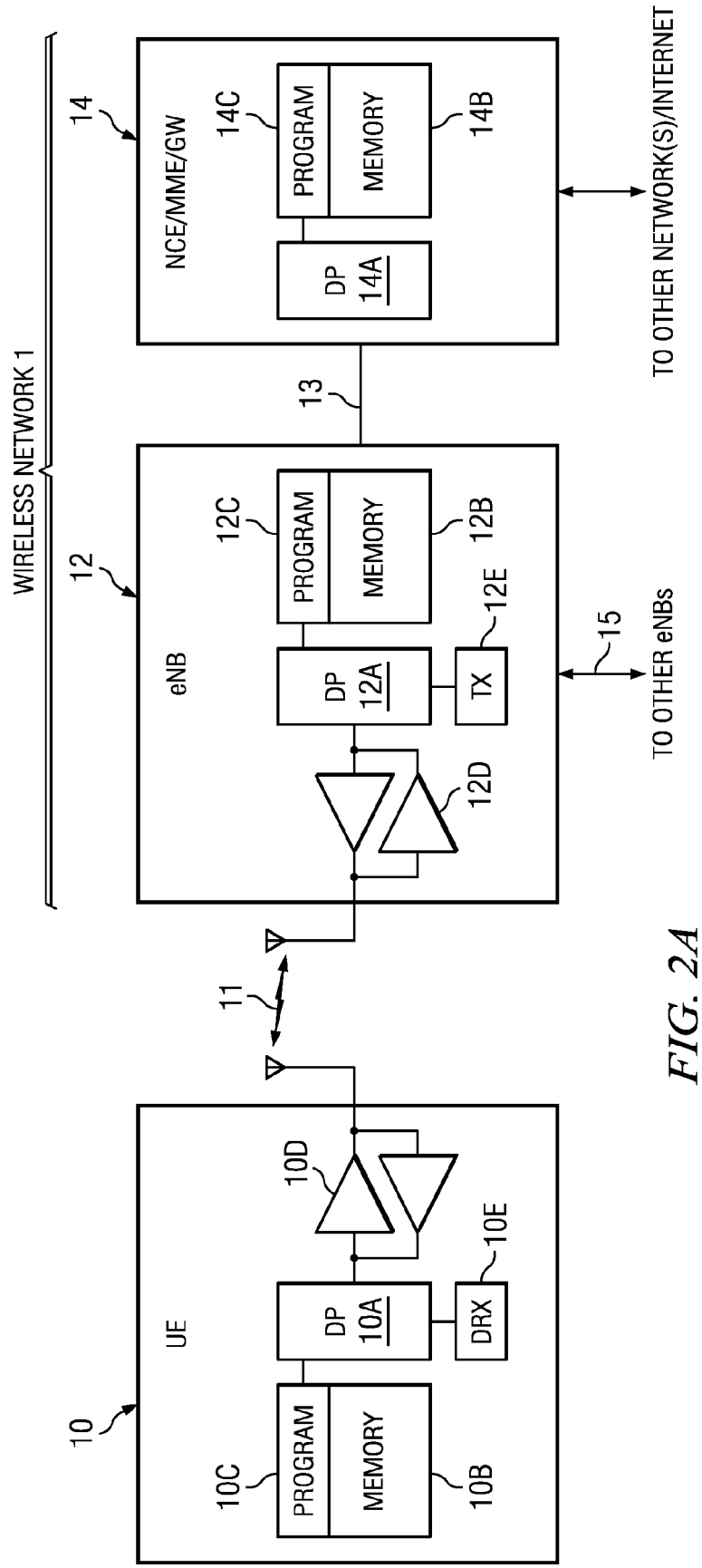
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A a wireless network (NW) 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with a network 1, such as a telephone network and/or a data communications network (e.g., the Internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer or a data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1. The eNB 12 may also be coupled to another eNB via data/control path 15, which may be implemented as the X2 interface shown in FIG. 1, for example.

In practice there will be a plurality of UEs 10, individual ones of which are capable of idle mode operation, as well as DRX operation.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention, in some exemplary embodiments the UE 10 may be assumed to also include a discontinuous reception block (DRX) 10E, and the eNB 12 may include a transmission block (TX) 12E. These blocks 10E, 12E enable the respective apparatus to function in accordance with the exemplary embodiments of the invention as described herein. In some exemplary embodiments, one or both of the DPs 10A, 12A and the transceivers 10D, 12D may comprise the blocks 10E, 12E and/or the associated functionality.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. In some exemplary embodiments, the MEMs 10B and 12B may be considered computer readable memories. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 2B:
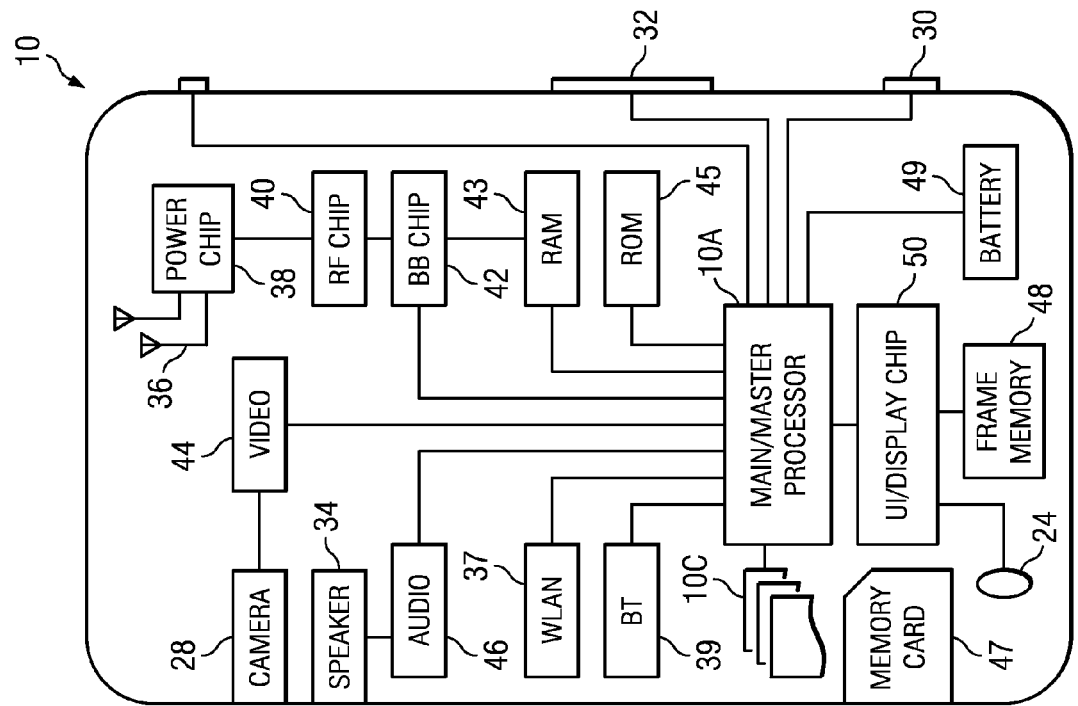
FIG. 2B shows a more particularized block diagram of an exemplary user equipment such as that shown in FIG. 2A.
Figure 2B:
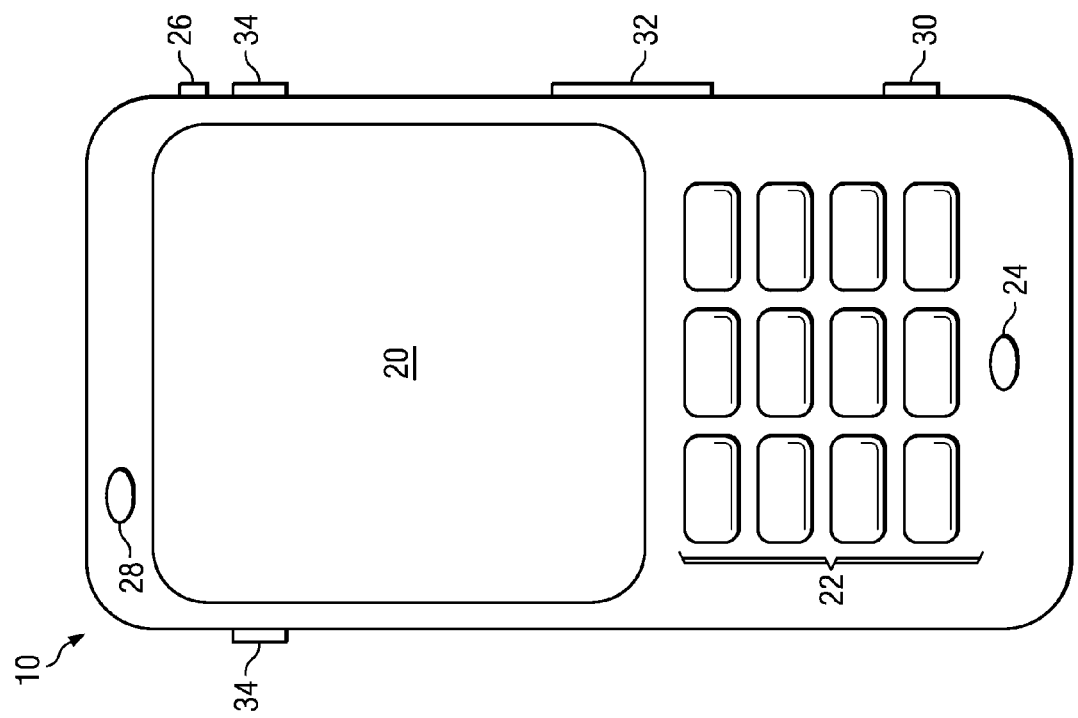
Figure 3:
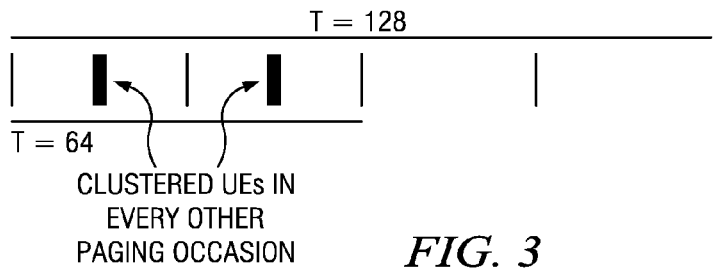
FIG. 3 shows the undesirable clustering of UEs in certain paging occasions, which is a result of the conventional approach to providing UE-specific DRX.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention may be most relevant to the processor(s) and/or transceiver(s), though it is noted that other exemplary embodiments need not be disposed in such devices or components, but may be disposed across various chips and/or memories as shown, or disposed within one or more other processors that combine one or more of the functions described above with respect to FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

The exemplary embodiments of this invention address and solve the problems identified above.

In a first exemplary embodiment, when giving UE-specific DRX parameters (e.g., in dedicated signaling as opposed to broadcast signaling/parameters) one may also provide other UE-specific parameters in addition to the paging DRX length. That is, the NW 1 also may give paging group parameters, or any parameters affecting the number of paging groups, in UE-specific DRX signaling (i.e., not just the paging DRX length).

Note that in UTRAN/GERAN this type of dedicated signaling is generally performed via a Location Update Procedure. In E-UTRAN this type of dedicated signaling can be performed by the same procedure or by any other suitable dedicated signaling procedure or means.

In a second exemplary embodiment, the calculation of the paging DRX in the case of UE-specific DRX is modified. For example, in the case of UE-specific DRX the Tue parameter (UE-specific paging DRX) is allocated. The value for T in the equation for the radio frame calculation is the one given in the dedicated signaling, and N is N/(T/Tue) (e.g., in the example given above N=N/(128/64)=N/2, thereby causing the UEs 10 to be uniformly distributed). This is true due at least to the fact that the number of paging groups during a paging DRX is made uniform independently of the paging DRX value.

For example, in the example provided above, without considering UE-specific paging DRX UEs, during 128 radio frames (T) there are 64 paging groups (N). That is, there is a paging group in every other radio frame. However, by adding a UE with a UE-specific DRX of 64 (Tue), one still has N=64. This implies that there is a paging group of UE-specific paging DRX in every radio frame, and that every other radio frame will also have UEs 10 with non-UE-specific paging DRX. This would cause a non-uniform distribution of UEs.

It should be noted that the paging calculation may be performed in the UE 10, the eNB 12 or both the UE 10 and the eNB 12 (or possibly in future systems at a higher NW 1 level, such as in the MME). In general, the calculation needs to yield the same results in order for the eNB 12 to be able to reach the UE 10 by the paging procedure.

Note that the first embodiment may be less preferred than the second since the MME (see FIG. 1, which may be viewed as the central element allocating paging parameters) may need to have knowledge of cell-specific paging parameters (as the number of paging groups should be different in a cell with many UEs as opposed to a cell with fewer UEs).

It also can be noted with regard to the foregoing that simply signaling (via dedicated signaling or broadcast signaling) the number of the radio frame level paging groups (3-bits) would consume unnecessary bits, as the number of paging groups cannot extend the length of the radio frame (the radio frame level equation is not designed to handle this situation). Also, separately signaling the number of paging groups (2-bits) at the subframe level would also consume unneeded bits, as in the current E-UTRAN standardization it has been agreed that the number of paging groups within a radio frame is not larger than one, unless the number of radio frame level paging is equal to the value of T (in radio frames).

Based on the above, in a third exemplary embodiment it would be preferred to encode N (Paging Group Count on the radio frame level) in relation to T (paging DRX). As a non-limiting example, N=⅛T, ¼T, ½T, T. In some further exemplary embodiments, this arrangement consumes 2 bits+2 bits for Nsubframes (e.g., 2 bits for N and 2 bits for Nsubframes). In such a manner, reasonable flexibility may be achieved in various different scenarios (e.g., it may be expected that even with very long DRX values the number of paging groups will not be less than ⅛th of T). In some cases, this third exemplary embodiment may be considered an extension or refinement of the second exemplary embodiment described above.

Additionally, one may consider including the subframe paging group number in the radio frame paging group number parameter, thereby implying that there is no possibility to have multiple subframes for paging unless all radio frames have at least one paging group. For example, N may then be coded as: N=⅛T, ¼T, ½T, T, 2T, 3T, 4T. Such an arrangement would consume/utilize 3 bits instead of 2+2 bits if separately signaling N and Nsubframes (e.g., 3 bits for N). In this exemplary case, 2T, 3T and 4T respectively mean that 2, 3 and 4 subframes are used in each radio frame for paging, thereby replacing a parameter that explicitly indicates how many subframes are used within a radio frame for paging.

The signaling and/or encoding described above with respect to the various exemplary embodiments of the invention may be signaled/transmitted using a system information message, such as a SIB2 message or PCCH-Configuration message, as non-limiting examples. Reference in this regard may be made to TS 36.331 V8.0.0 (2007-12), "3rd Generation Partnership Project; Technical Specification Group Radio Access Network; Evolved Universal Terrestrial Radio Access (E-UTRA) Radio Resource Control (RRC); Protocol specification (Release 8). In some exemplary embodiments, this first message is read (e.g., received) by the UE at least at every cell change (e.g., at least every time the UE selects a new cell).

Based on the foregoing it should be apparent that the exemplary embodiments of this invention provide a method, apparatus and computer program(s) to distribute paging groups uniformly in time, thereby avoiding the bunching of UEs in certain paging occasions.

The method, apparatus and computer program(s) as in the preceding paragraph, further comprising assigning a value to a UE to cause the paging groups to be distributed uniformly in time.

The method, apparatus and computer program(s) of the preceding paragraph, where the value is indicative of a UE-specific paging DRX.

The method, apparatus and computer program(s) as in the preceding paragraphs, further comprising implicitly indicating in signaling a value of a number of subframes that are used in a radio frame for paging.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 4:
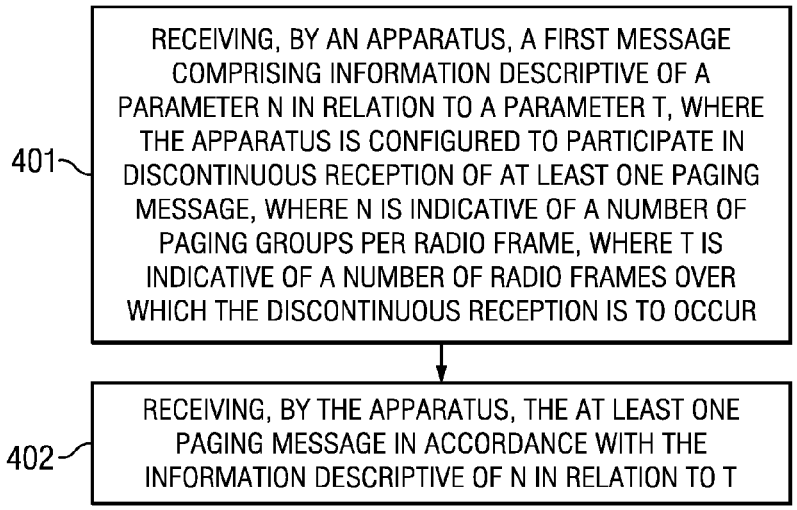
FIG. 4 is a logic flow diagram that illustrates the operation of an exemplary method, and a result of execution of computer program instructions embodied on a computer readable memory, in accordance with the exemplary embodiments of this invention.

In one exemplary embodiment, and with reference to FIG. 4, a method comprising: receiving, by an apparatus, a first message comprising information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur (401); and receiving, by the apparatus, the at least one paging message in accordance with the information descriptive of N in relation to T (402).

A method as above, where the information descriptive of N in relation to T comprises one of N=⅛T, ¼T, ½T, T, 2T, 3T or 4T. A method as in any above, where the information descriptive of N in relation to T is signaled in the first message using three bits. A method as in any above, where at least one of the first message and the at least one paging message is received on a physical downlink control channel.

A method as in any above, where a paging radio frame of the T radio frames for each paging occasion is given by:

$$SFN \bmod T = (T \text{ div } N) * (UE\_ID \bmod N),$$

where SFN is a system frame number, UE_ID is an identifier for the apparatus, div is a division operation and mod is a modulus operation.

A method as in any above, where the first message and the at least one paging message are received from an access node, a base station, a Node B or an evolved Node B. A method as in any above, where the method is performed within an evolved universal terrestrial radio access network. A method as in any above, where the information descriptive of N in relation to T comprises one of N=⅛T, ¼T, ½T or T. A method as in any above, where the information descriptive of N in relation to T is signaled using two bits. A method as in any above, where the information descriptive of N in relation to T is further indicative of a number of subframes used in each radio frame for paging. A method as in any above, where T is a multiple of N or N is a multiple of T. A method as in any above, where the information descriptive of N in relation to T is signaled using at least two bits. A method as in any above, where the first message comprises a system information message (e.g., a SIB2 message, a PCCH-Configuration message). A method as in any above, where the first message is received in response to the apparatus selecting a new cell (e.g., every time the apparatus changes cells).

A method as in any above, implemented as a computer program. A method as in any above, implemented as a computer program stored on a computer-readable medium. A computer program comprising computer program instruction that, when loaded in a processor, perform operations according to one or more (e.g., any one) of the above-described methods. A method as in any above, further comprising one or more further aspects of the exemplary embodiments of the invention as described herein.

In another exemplary embodiment, a program storage device readable by a machine (e.g., an apparatus, a device, a mobile device), tangibly embodying a program of instructions executable by the machine for performing operations, said operations comprising: receiving, by the machine, a first message comprising information descriptive of a parameter N in relation to a parameter T, where the machine is configured to participate in discontinuous reception of at least one paging message, where N is indicative of a number of paging groups per radio frame, where T is indicative of a number of radio frames over which the discontinuous reception is to occur (401); and receiving, by the apparatus, the at least one paging message in accordance with the information descriptive of N in relation to T (402).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

In another exemplary embodiment, an apparatus comprising: a processor configured to implement discontinuous reception of at least one paging message; and a receiver configured to receive a first message comprising information descriptive of a parameter N in relation to a parameter T, where N is indicative of a number of paging groups per radio frame, where T is indicative of a number of radio frames over which the discontinuous reception is to occur, where the receiver is further configured to receive the at least one paging message in accordance with the information descriptive of N in relation to T.

An apparatus as above, where the apparatus comprises a mobile phone. An apparatus as in any above, further comprising one or more additional aspects of the exemplary embodiments of the invention as described herein.

In another exemplary embodiment, an apparatus comprising: means for implementing discontinuous reception of at least one paging message; and means for receiving a first message comprising information descriptive of a parameter N in relation to a parameter T, where N is indicative of a number of paging groups per radio frame, where T is indicative of a number of radio frames over which the discontinuous reception is to occur, where the means for receiving is further for receiving the at least one paging message in accordance with the information descriptive of N in relation to T.

An apparatus as above, where the means for implementing comprises a processor and the means for receiving comprises a receiver. An apparatus as in any above, where the apparatus comprises a mobile phone. An apparatus as in any above, further comprising one or more additional aspects of the exemplary embodiments of the invention as described herein.

In another exemplary embodiment, an apparatus comprising: implementation circuitry configured to implement discontinuous reception of at least one paging message; and reception circuitry configured to receive a first message comprising information descriptive of a parameter N in relation to a parameter T, where N is indicative of a number of paging groups per radio frame, where T is indicative of a number of radio frames over which the discontinuous reception is to occur, where the receiver is further configured to receive the at least one paging message in accordance with the information descriptive of N in relation to T.

An apparatus as above, where the apparatus comprises a mobile phone. An apparatus as in any above, further comprising one or more additional aspects of the exemplary embodiments of the invention as described herein.

In another exemplary embodiment, an apparatus comprising: first means for receiving a first message comprising information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur; and second means for receiving the at least one paging message in accordance with the information descriptive of N in relation to T.

An apparatus as above, where the first means for receiving and the second means for receiving comprise a receiver. An apparatus as in any above, where the apparatus comprises a mobile phone. An apparatus as in any above, further comprising one or more additional aspects of the exemplary embodiments of the invention as described herein.

In another exemplary embodiment, an apparatus comprising: first reception circuitry configured to receive a first message comprising information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur; and second reception circuitry configured to receive the at least one paging message in accordance with the information descriptive of N in relation to T.

An apparatus as above, where the apparatus comprises a mobile phone. An apparatus as in any above, further comprising one or more additional aspects of the exemplary embodiments of the invention as described herein.

Figure 5:
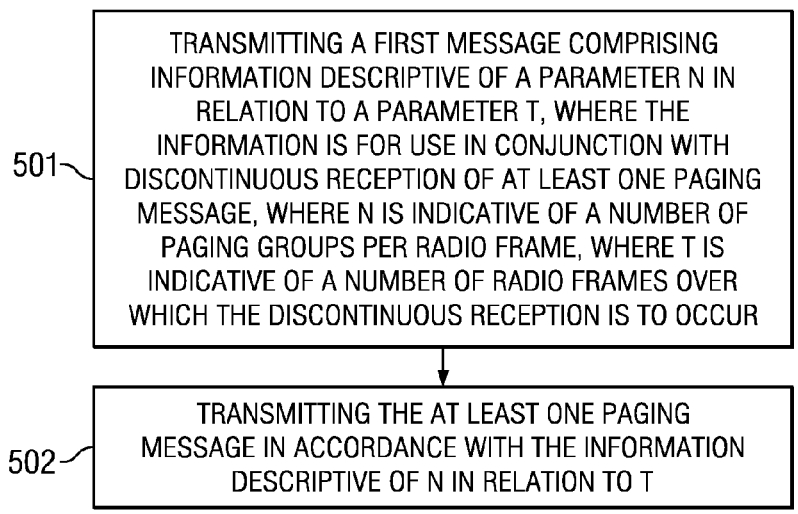
FIG. 5 is a logic flow diagram that illustrates the operation of another exemplary method, and a result of execution of computer program instructions embodied on a computer readable memory, in accordance with the exemplary embodiments of this invention.

In another exemplary embodiment, and with reference to FIG. 5, a method comprising: transmitting a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur (501); and transmitting the at least one paging message in accordance with the information descriptive of N in relation to T (502).

A method as in any above, implemented as a computer program. A method as in any above, implemented as a computer program stored on a computer-readable medium. A computer program comprising computer program instruction that, when loaded in a processor, perform operations according to one or more (e.g., any one) of the above-described methods. A method as in any above, further comprising one or more further aspects of the exemplary embodiments of the invention as described herein.

In another exemplary embodiment, a program storage device readable by a machine, tangibly embodying a program of instructions executable by the machine for performing operations, said operations comprising: transmitting a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur (501); and transmitting the at least one paging message in accordance with the information descriptive of N in relation to T (502).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

In another exemplary embodiment, an apparatus comprising: a processor configured to generate a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and a transmitter configured to transmit the first message, where the transmitter is further configured to transmit the at least one paging message in accordance with the information descriptive of N in relation to T.

An apparatus as above, where the apparatus comprises an access node, a base station, a Node B or an evolved Node B. An apparatus as in any above, further comprising one or more additional aspects of the exemplary embodiments of the invention as described herein.

In another exemplary embodiment, an apparatus comprising: means for generating a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and means for transmitting the first message, where the transmitter is further configured to transmit the at least one paging message in accordance with the information descriptive of N in relation to T.

An apparatus as above, where the means for generating comprises a processor and the means for transmitting comprises a transmitter. An apparatus as in any above, where the apparatus comprises an access node, a base station, a Node B or an evolved Node B. An apparatus as in any above, further comprising one or more additional aspects of the exemplary embodiments of the invention as described herein.

In another exemplary embodiment, an apparatus comprising: processing circuitry configured to generate a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and transmission circuitry configured to transmit the first message, where the transmitter is further configured to transmit the at least one paging message in accordance with the information descriptive of N in relation to T.

An apparatus as above, where the apparatus comprises an access node, a base station, a Node B or an evolved Node B. An apparatus as in any above, further comprising one or more additional aspects of the exemplary embodiments of the invention as described herein.

In another exemplary embodiment, an apparatus comprising: first means for transmitting a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and second means for transmitting the at least one paging message in accordance with the information descriptive of N in relation to T.

An apparatus as above, where the first means for transmitting and the second means for transmitting comprise a transmitter or a transceiver. An apparatus as in any above, where the apparatus comprises an access node, a base station, a Node B or an evolved Node B. An apparatus as in any above, further comprising one or more additional aspects of the exemplary embodiments of the invention as described herein.

In another exemplary embodiment, an apparatus comprising: first transmission circuitry configured to transmit a first message comprising information descriptive of a parameter N in relation to a parameter T, where the information is for use in conjunction with discontinuous reception of at least one paging message, where N is indicative of a number of paging groups per radio frame, where T is indicative of a number of radio frames over which the discontinuous reception is to occur; and second transmission circuitry configured to transmit the at least one paging message in accordance with the information descriptive of N in relation to T.

An apparatus as above, where the apparatus comprises an access node, a base station, a Node B or an evolved Node B. An apparatus as in any above, further comprising one or more additional aspects of the exemplary embodiments of the invention as described herein.

In another exemplary embodiment, a computer-readable medium storing program instructions, execution of the program instructions by a processor of an apparatus resulting in operations comprising: receiving a first message comprising information descriptive of a parameter N in relation to a parameter T, where the apparatus is configured to participate in discontinuous reception of at least one paging message, where N is indicative of a number of paging groups per radio frame, where T is indicative of a number of radio frames over which the discontinuous reception is to occur; and receiving the at least one paging message in accordance with the information descriptive of N in relation to T.

A computer-readable medium as above, where the information descriptive of N in relation to T comprises one of N=⅛T, ¼T, ½T, T, 2T, 3T or 4T. A computer-readable medium as in any above, where at least one of the first message and the at least one paging message is received on a physical downlink control channel. A computer-readable medium as in any above, where a paging radio frame of the T radio frames for each paging occasion is given by:

$$SFN \bmod T = (T \operatorname{div} N) * (UE\_ID \bmod N),$$

where SFN is a system frame number, UE_ID is an identifier for the apparatus, div is a division operation and mod is a modulus operation. A computer-readable medium as in any above, where the first message and the at least one paging message are received from an access node, a base station, a Node B or an evolved Node B. A computer-readable medium as in any above, where the apparatus comprises a node of an evolved universal terrestrial radio access network.

The various blocks shown in FIGS. 4 and 5 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 4 and 5 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 4 and 5 so as to implement one or more further exemplary embodiments of the invention, such as those described in further detail herein.

That is, the non-limiting, exemplary embodiments of the invention shown in FIGS. 4 and 5 may be implemented, practiced or utilized in conjunction with one or more further aspects in any combination (e.g., any combination that is practicable, suitable and/or feasible) and are not limited only to the blocks, steps, functions and/or operations illustrated in FIGS. 4 and 5.

While described above with respect to radio frames, the exemplary embodiments of the invention may be utilized in conjunction with other measures of times. As a non-limiting example, a method comprising: receiving, by an apparatus, a first message comprising information descriptive of a parameter N in relation to a parameter T, where the apparatus is configured to participate in discontinuous reception of at least one paging message, where N is indicative of a number of paging groups per a first time period, where T is indicative of a number of second time periods over which the discontinuous reception is to occur; and receiving, by the apparatus, the at least one paging message in accordance with the information descriptive of N in relation to T. As a further example, a method as above, where the first time period consists of one radio frame and the second time periods comprise a plurality of radio frames.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as, for example, systems utilizing DRX (e.g., DL DRX) and/or DRX paging (e.g., in the DL).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency (RF) region, the microwave region and the optical region (both visible and invisible), as several non-limiting and non-exhaustive examples.

Further, the various names used for the described parameters (e.g., N, T, Tue, Nsubframes, etc.) are not intended to be limiting in any respect, as these parameters may be identified by any suitable names. Further, the formulas and expressions that use these various parameters may differ from those expressly disclosed herein. Further, the various names assigned to different channels (e.g., PCCH, PDCCH etc.) are not intended to be limiting in any respect, as these various channels may be identified by any suitable names.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. For example, a UE may utilize T or Tue depending on one or more other factors. As a further non-limiting example, a UE may utilize Tue if it is signaled to the UE and if Tue is smaller than T. As another non-limiting example, while described primarily in reference to radio frames, the exemplary embodiments of the invention are not limited thereto, and may be utilized in conjunction with any suitable measure (e.g., measure of time) or designation (e.g., any suitable time period(s)). However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
receiving, by an apparatus, a first message comprising information descriptive of a parameter N in relation to a parameter T, where the apparatus is configured to participate in discontinuous reception of at least one paging message, where N is indicative of a number of paging groups in each radio frame during the discontinuous reception, where T is indicative of a number of radio frames over which the discontinuous reception is to occur, and where N is a mathematical function of T, where the information descriptive of N in relation to T comprises one of N=⅛T, ¼T, ½T, T, 2T, 3T or 4T; and
receiving, by the apparatus, the at least one paging message in accordance with the information descriptive of N in relation to T.

2. A method as in claim 1, where the information descriptive of N in relation to T is signaled in the first message using three bits.

3. A method as in claim 1, where at least one of the first message and the at least one paging message is received on a physical downlink control channel.

4. A method as in claim 1, where a paging radio frame of the T radio frames for each paging occasion is given by:

$$SFN \bmod T = (T \text{ div } N)*(UE\_ID \bmod N),$$

where SFN is a system frame number, UE_ID is an identifier for the apparatus, div is a division operation and mod is a modulus operation.

5. A method as in claim 1, where the first message and the at least one paging message are received from an access node, a base station, a Node B or an evolved Node B.

6. A method as in claim 1, where the method is performed within an evolved universal terrestrial radio access network.

7. A method as in claim 1, where the method is implemented as a computer program stored on a non-transitory computer-readable medium.

8. An apparatus comprising:
a processor; and
a memory including computer program code, where the apparatus is configured to
participate in discontinuous reception of at least one paging message, the memory and the computer program code being configured to, with the processor, cause the apparatus at least to perform:
receive a first message comprising information descriptive of a parameter N in relation to a parameter T, where N is indicative of a number of paging groups in each radio frame during the discontinuous reception, where T is indicative of a number of radio frames over which the discontinuous reception is to occur, and where N is a function of T, where the information descriptive of N in relation to T comprises one of $N=\frac{1}{8}T, \frac{1}{4}T, \frac{1}{2}T, T, 2T, 3T$ or $4T$; and
receive the at least one paging message in accordance with the information descriptive of N in relation to T.

9. An apparatus as in claim 8, where the information descriptive of N in relation to T is signaled in the first message using three bits.

10. An apparatus as in claim 8, where the apparatus comprises a mobile phone.

11. A method comprising:
transmitting a first message comprising information descriptive of a parameter N in relation to a parameter T, where the information is for use in conjunction with discontinuous reception of at least one paging message, where N is indicative of a number of paging groups in each radio frame during the discontinuous reception, where T is indicative of a number of radio frames over which the discontinuous reception is to occur, and where N is a function of T, where the information descriptive of N in relation to T comprises one of $N=\frac{1}{8}T, \frac{1}{4}T, \frac{1}{2}T, T, 2T, 3T$ or $4T$; and
transmitting the at least one paging message in accordance with the information descriptive of N in relation to T.

12. A method as in claim 11, where the information descriptive of N in relation to T is signaled in the first message using three bits.

13. A method as in claim 11, where the method is implemented as a computer program stored on a non-transitory computer-readable medium.

14. An apparatus comprising:
a processor; and
a memory including computer program code, the memory and the computer program code being configured to, with the processor, cause the apparatus at least to perform:
generate a first message comprising information descriptive of a parameter N in relation to a parameter T, where the information is for use in conjunction with discontinuous reception of at least one paging message, where N is indicative of a number of paging groups in each radio frame during the discontinuous reception, where T is indicative of a number of radio flames over which the discontinuous reception is to occur, and where N is a function of T, where the information descriptive of N in relation to T comprises one of $N=\frac{1}{8}T, \frac{1}{4}T, \frac{1}{2}T, T, 2T, 3T$ or $4T$;
transmit the first message; and
transmit the at least one paging message in accordance with the information descriptive of N in relation to T.

15. An apparatus as in claim 14, where the information descriptive of N in relation to T is signaled in the first message using three bits.

16. An apparatus as in claim 14, where the apparatus comprises an access node, a base station, a Node B or an evolved Node B. cm 1. A method, comprising:
receiving, by an apparatus, a first message comprising information descriptive of a parameter N in relation to a parameter T, where the apparatus is configured to participate in discontinuous reception of at least one paging message, where N is indicative of a number of paging groups in each radio frame during the discontinuous reception, where T is indicative of a number of radio frames over which the discontinuous reception is to occur, and where N is a mathematical function of T, where the information descriptive of N in relation to T comprises one of $N=\frac{1}{8}T, \frac{1}{4}T, \frac{1}{2}T, T, 2T, 3T$ or $4T$; and
receiving, by the apparatus, the at least one paging message in accordance with the information descriptive of N in relation to T.

* * * * *

UNITED STATES PATENT AND TRADEMARK OFFICE
CERTIFICATE OF CORRECTION

PATENT NO. : 8,792,919 B2  
APPLICATION NO. : 12/390172  
DATED : July 29, 2014  
INVENTOR(S) : Koskela Page 1 of 1

It is certified that error appears in the above-identified patent and that said Letters Patent is hereby corrected as shown below:

In the Claims

Claim 14, col. 18, line 17 "flames" should be deleted and --frames-- should be inserted.

Claim 15, col. 18, line 25 "Tis" should be deleted and --T is-- should be inserted.

Claim 16, col. 18, line 29 "An apparatus as in claim 14, where the apparatus comprises an access node, a base station, Node B or an evolved Node B. em 1. A method, comprising: receiving, by an apparatus, a first message comprising information descriptive of a parameter N in relation to a parameter T, where the apparatus is configured to participate in discontinuous reception of at least one paging message, where N is indicative of a number of paging groups in each radio frame during the discontinuous reception, where T is indicative of a number of radio frames over which the discontinuous reception is to occur, and where N is a function of T, where the information descriptive of N in relation to T comprises one of N = 1/8T, 1/4T, 1/2T, T, 2T, 3T or 4T; and receiving, by the apparatus, the at least one paging message in accordance with the information descriptive of N in relation to T." should be deleted and --An apparatus as in claim 14, where the apparatus comprises an access node, a base station, Node B or an evolved Node B.-- should be inserted.

Signed and Sealed this  
Thirtieth Day of September, 2014

Michelle K. Lee  
*Deputy Director of the United States Patent and Trademark Office*